No. 871,954. PATENTED NOV. 26, 1907.
A. RECTOR.
INCANDESCENT GAS LAMP.
APPLICATION FILED JULY 30, 1906.

WITNESSES
Max B. A. Doring
Mary A. S. Moeller

INVENTOR
Alcorn Rector,
BY
W. B. Hutchinson,
ATTORNEY

THE NORRIS PETERS CO., WASHINGTON, D. C.

UNITED STATES PATENT OFFICE.

ALCORN RECTOR, OF NEW YORK, N. Y., ASSIGNOR TO RECTOR GAS LAMP COMPANY, OF NEW YORK, N. Y., A CORPORATION OF CONNECTICUT.

INCANDESCENT GAS-LAMP.

No. 871,954.

Specification of Letters Patent.

Patented Nov. 26, 1907.

Application filed July 30, 1906. Serial No. 328,328.

*To all whom it may concern:*

Be it known that I, ALCORN RECTOR, of the city, county, and State of New York, have invented a new and Improved Incandescent Gas-Lamp, of which the following is a full, clear, and exact description.

My invention relates to improvements in incandescent gas lamps, and the object of my invention is to produce a lamp having plural chimneys and plural air drafts within and without the mantle so as to produce complete combustion and a brilliant light, to provide for such a structure an intensifier which will still further promote combustion, and in combination with a lamp of this character to provide a blower attachment which is driven by the inrush of air to the lamp mentioned, and which will supply air to a second lamp or lamps used in combination with the first mentioned lamp. In connection with this lamp and combination a burner such as I have shown in my application for Letters Patent of the United States No. 325,686, filed July 11, 1906, can be used to advantage. By the arrangement specified I am enabled to get a great supply of oxygen to the mantle, and I am also able by the inrush of air to supply excess air to the outer lamp or series of lamps, and so I get a great quantity of economical light.

With these ends in view, my invention consists of certain features of construction, and combinations of parts which will be hereinafter described and claimed.

Reference is to be had to the accompanying drawings forming a part of this specification, in which similar figures of reference indicate corresponding parts in all the views.

Figure 1:
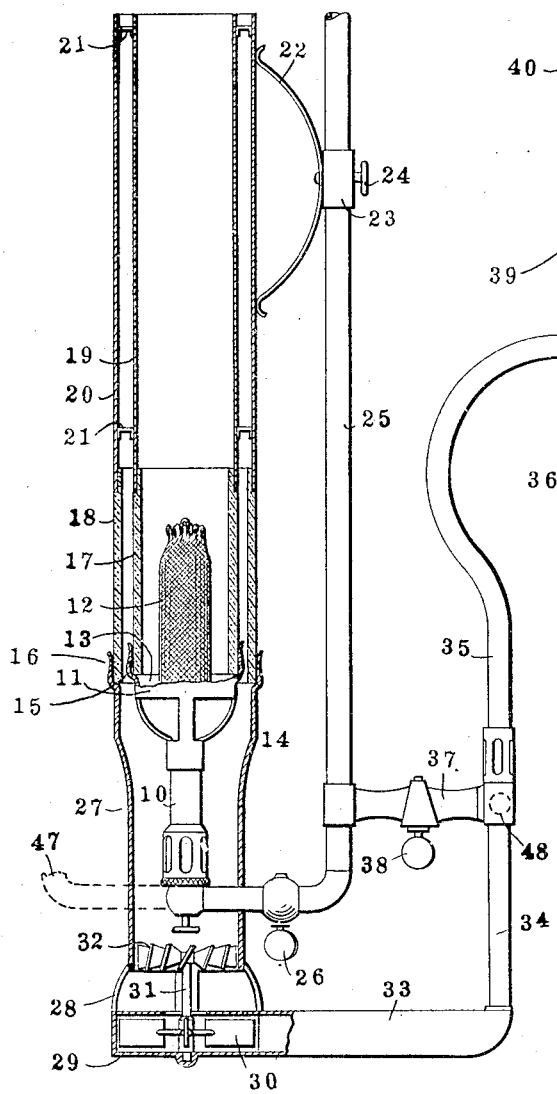
Figure 2:
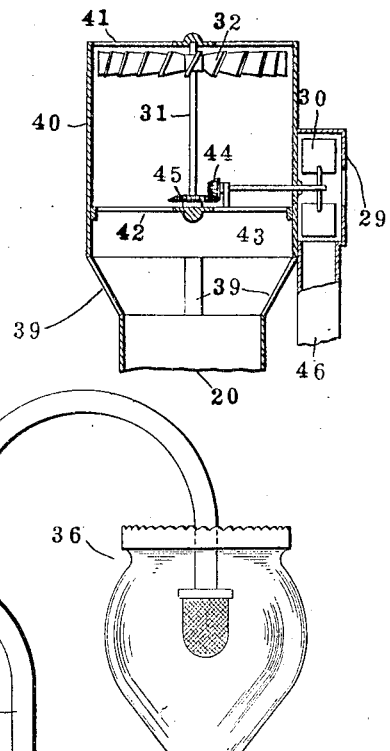

Figure 1 is a vertical section partly in side elevation of the lamp and attachments belonging to my invention, and Fig. 2 is a double sectional view of a construction which can be used together with that shown in Fig. 1, or separately from it.

The Bunsen tube 10 carries at the top a center draft burner 11 preferably of the kind referred to above, and this is arranged to deliver air inside the mantle 12 and outside through the channels 13 and 14.

I do not limit my invention to the particular form of the burner so long as it has the double channels and the means for getting the air into and outside of the mantle, but in order that the draft may be great and a large supply of air induced to enter the lamp, I use two chimney holders 15 and 16, and these carry the chimneys 17 and 18. These are spaced apart so that the chimneys form continuations of the air channels 13 and 14. Above the chimneys I use an intensifier which is practically an extension of the chimneys and is formed of the concentric tubes 19 and 20 which are united by suitable spacing devices 21 so that they will form one structure and can be handled as one, and these are supported by the spring 22 which is fast to the keeper or ferrule 23 which is held by a set screw 24 to the gas pipe 25. The particular means of fastening the intensifier is not essential, however, but the means should be somewhat resilient so as to provide for any necessary inclination of the intensifier and chimneys.

The gas pipe 25 is controlled by a cock 26 as usual, and it supplies gas to the Bunsen tube 10. The Bunsen tube 10 is arranged inside a metallic casing or flue 27 which is open at the bottom and which supports by means of the hangers 28 or equivalent devices a blower 29 of any suitable construction and the fans 30 of the blower are driven by a shaft 31 which in turn is driven by a wind wheel 32 arranged in the intake of the flue or casing 27. This arrangement of wind wheel and blower is shown in my former application, referred to above, and is not here claimed.

The blower 29 delivers through a pipe 33 to a pipe 34 which enters the Bunsen tube 35 of a second lamp 36 which lamp is here shown as of an inverted type, but which can be of any approved type, and if desired, a group of lamps can be supplied from the pipe 34. The bunsen 35 receives its gas from the branch pipe 37 which connects with the pipe 25 and is controlled by a cock 38.

In Fig. 2 I have shown a construction which can be used in connection with that shown in Fig. 1, or which can be used independently if preferred. In this case the intensifier 20 supports by means of arms 39 a casing 40, and a wind wheel 32 like that already described is mounted in the casing 40, the shaft 31 being supported in cross pieces 41 and 42 in the casing. In this instance the blower 29 has its axis horizontally arranged and its fans 30 are carried by a shaft 43 which connects by gears 44 and 45 with the shaft 31. A discharge pipe 46 leads from the blower and this can connect as shown by dotted lines at 47 with the bunsen 10 or as shown at 48 with the bunsen of the lamp 36.

It will be seen that in this structure the wind wheel is driven by the heat which rises from the lamp and as it passes through the casing 40 it will cause an intraining of air between the arms 39 and the wind wheel will be driven with considerable force, and it can be utilized to feed its own lamp or others as stated above.

It will be understood that I can use the two wind wheels at the top and bottom of a lamp in combination, or that I can use either separately without affecting the principle of my invention.

From the foregoing description it will be seen that I provide a very efficient plural flue lamp which is of itself a lamp of great and economical lighting qualities, and I also utilize this lamp to feed air to itself or an adjacent lamp or lamps. As a result, I get a great deal of light with a comparatively small consumption of gas.

Having thus fully described my invention, I claim as new and desire to secure by Letters Patent,—

1. In combination, a supply pipe, Bunsen burners in communication with said pipe, a casing carried by one of the Bunsen burners, a second casing supported by the first named casing, a connection between the second casing and the remaining burners, fans within the second casing, and means within the first named casing for operating the fans.

2. In combination, a supply pipe, Bunsen burners in communication with said pipe, a suitably supported casing surrounding one of the Bunsen burners, a draft tube supported by said casing and burner, a second casing supported by the first named casing, a connection between the second casing and the remainder of the burners, fans within a second casing, and means within the first named casing for operating the fans.

3. In combination, a supply pipe, Bunsen burners in communication with said pipe, a casing carried by and surrounding one of the Bunsen burners, a second casing supported by the first named casing, a connection between the second casing and the remaining burners, fans within the second casing, and means within the first named casing for operating the fans.

4. In combination, a supply pipe, Bunsen burners in communication with said pipe, suitably supported draft tubes acting in conjunction with one of the burners, a casing, a connection between the casing and the remainder of the burners, fans in the casing, and means operating in conjunction with the draft tube for rotating the fans.

5. In combination, a supply pipe, Bunsen burners in communication with said pipe, suitably supported draft tubes acting in conjunction with one of the burners, a casing, a connection between the casing and the remainder of the burners, fans in the casing, means made operative by the draft tubes for rotating the fans, and an intensifier for the draft tubes.

6. In combination, a supply pipe, Bunsen burners in communication with said pipe, suitably supported draft tubes acting in conjunction with one of the burners, a casing, a connection between the casing and the remainder of the burners, fans in the casing, means made operative by the draft tubes for operating the fans, and an intensifier for the draft tubes supported by the supply pipe.

7. In combination, a supply pipe, Bunsen burners in communication with said pipe, draft creating means acting in conjunction with one of the burners, a casing suitably supported, a connection between the casing and the remainder of the burners, fans in the casing, and means made operative by the draft creating means for rotating the fans.

8. In combination, a supply pipe, Bunsen burners in communication with said pipe, a casing carried by one of the burners, a draft tube carried by said burner, a second draft tube carried by the casing, the draft tube of the burner being positioned within the draft tube of the casing, a second casing supported by the first named casing, a connection between the second named casing and the remainder of the burners, fans within the second named casing, and means within the first named casing for operating the fans.

9. In combination, a supply pipe, Bunsen burners in communication with said pipe, a casing carried by one of the burners, a second casing supported by the first named casing therebeneath, a connection between the second casing and the remaining burners, fans within the second casing, and means within the first named casing for operating the fans.

ALCORN RECTOR.

Witnesses:
WARREN B. HUTCHINSON,
GEO. A. OPDYKE.